May 9, 1967 W. A. KEARSLEY 3,319,146
HIGH EFFICIENCY CONVERTER CIRCUIT
Original Filed March 1, 1963

INVENTOR.
WAYNE A. KEARSLEY
BY
ATTORNEYS

United States Patent Office 3,319,146
Patented May 9, 1967

3,319,146
HIGH EFFICIENCY CONVERTER CIRCUIT
Wayne A. Kearsley, Chelmsford, Mass., assignor to EG&G, Inc., a corporation of Massachusetts
Continuation of application Ser. No. 262,068, Mar. 1, 1963. This application June 10, 1966, Ser. No. 556,767
13 Claims. (Cl. 320—1)

ABSTRACT OF THE DISCLOSURE

A flyback converter circuit for charging a capacitor having a crowbar circuit connected directly to the terminals of any winding of the flyback transformer and adapted to be operative only during flyback intervals and after the capacitor has been charged to a predetermined voltage to prevent further charging of the capacitor and to lengthen the flyback interval.

This application is a continuation of application Ser. No. 262,068, filed Mar. 1, 1963, now abandoned.

My invention relates generally to D.C.-to-D.C. converter circuits and more particularly to means for improving the efficiency of such circuits.

A D.C.-to-D.C. converter circuit converts a low D.C. voltage to a pulsating voltage that may be easily stepped up or down through a transformer and rectified to produce the desired D.C. voltage. D.C.-to-D.C. converters have had extensive use in the prior art. One well-known use has been to charge a capacitor to a predetermined high voltage from a low voltage source, for example, a battery. The energy stored in the capacitor may, for example, be used to produce a flash of light when it is discharged through a flashlamp or a spark gap.

When one employs a D.C.-to-D.C. converter circuit to charge a capacitor, caution must be exercised not to over-voltage the capacitor destroying said capacitor. Also, it is desirable to maintain the voltage on the capacitor at a relatively constant value.

Since the use of batteries as the low D.C. voltage supply is very common, efficiency and battery life present serious problems. Therefore, the circuitry designed to shut off a converter circuit when the output voltage has reached a predetermined level should use as little battery power as possible to maintain optimum efficiency.

It is, therefore, an object of this invention to increase the efficiency of a known converter circuit.

Another object of my invention is to provide means to shut off the converter circuit automatically when the output capacitor voltage has reached a predetermined value.

Still another object of my invention is to maintain the voltage on the output capacitor at a relatively constant value.

Briefly, my invention comprises a sensing means connected across one of the windings of the transformer used in a converter circuit. When the output capacitor has been charged to the desired voltage, the sensing means conducts presenting a low resistance to that winding thereby greatly increasing the time it takes to discharge the energy in the transformer. The converter is inoperable until this energy has been discharged, during which time the power of the low voltage source is conserved, thereby increasing efficiency.

Further objects of the invention will be discussed hereinafter and novel features thereof will be pointed out in the appended claims. A clearer understanding will be had from the following description taken together with the attached drawings, in which:

Figure 1:
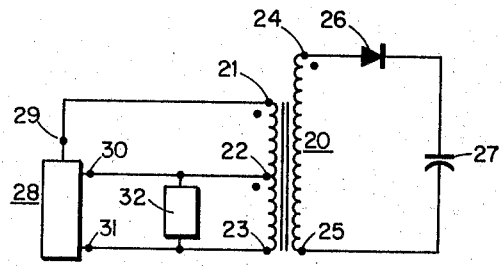
FIGURE 1 is a simplified schematic drawing of my invention.

With reference to FIGURE 1 there is shown a transformer 20 having an input winding represented by the turns between terminals 22 and 23, a control winding represented by the turns between terminals 21 and 22, and an output winding represented by the turns between terminals 24 and 25. Connected to the output winding 24–25, there is shown a diode 26, one electrode of which is connected to terminal 24 of transformer 20. The other electrode of diode 26 is connected to one plate of capacitor 27. The other plate of capacitor 27 is connected to terminal 25 of transformer 20. Also there is shown a switching device 28 having terminals 29, 30 and 31. Switching device 28 may be mechanical, electromechanical, or an electronic switch, or any other device that will interrupt current flow. Since electronic switches are more commonly used in converter circuits, the following discussion will be limited to electronic switches. This is not to say that the other switches heretofore mentioned have not been adapted to the conventional converter circuits. For the purposes of discussion, consider terminal 29 to be the grid of a tube or the base of a transistor, terminal 30 to be the cathode of a tube or the emitter of a transistor, and terminal 31 to be the plate of a tube or the collector of a transistor. Connected across terminals 29 and 30 of switching device 28 is control winding 21–22 of transformer 20. Input winding 22–23 of transformer 20 connects across terminals 30 and 31. Also connected across input winding 22–23 is sensing means 32, but it will hereinafter be shown that this sensing means may also be connected between terminals 21–22, 21–23, or 24–25 of transformer 20 without departing from the unique concept of my invention.

The inductive relationship between control winding 21–22 and input winding 22–23, is such that, when the current in input winding 22–23 is increasing, a voltage is induced in control winding 21–22 that tends to cause switching device 28 to conduct. Conversely, when current is decreasing in input winding 22–23 a voltage is induced in control winding 21–22 that tends to cause switching device 28 to shut off.

The A.C. operation of the above described circuit without sensing means 32 connected therein will now be explained. With a proper voltage supply (not shown) in the output circuit of switching device 28, a current will start to flow in input winding 22–23. As this current starts to flow, a voltage is induced in control winding 21–22 which allows switching device 28 to pass more current. This regenerative action continues until switching device 28 reaches saturation or cannot sustain any further increase in current. Of course, during this interval, energy is being stored in transformer 20 as well as voltage being induced in output winding 24–25 of transformer 20, but this voltage is of such polarity that diode 26 cannot conduct. Up to this saturation point no energy is transferred to capacitor 27. Just after saturation of switching device 28 has been reached, the current in input winding 22–23 stops increasing, causing the induced voltages in transformer 20 to dcrease, thereby driving switching device 28 into cut-off very quickly. When switching device 28 reaches cut-off, the energy stored in transformer 20 starts to discharge, causing a different set of voltages to be induced in said transformer windings whose polarities are opposite to those present prior to saturation. The polarity of the voltage induced in control winding 21–22 is such that it maintains switching device 28 in the cut-off condition. The voltage in output winding 24–25 begins to rise extremely fast and theoretically the magnitude of said voltage could reach infinity in zero time. However, when this induced voltage reaches the magnitude that exceeds any voltage on capacitor 27 and the forward conducting voltage of diode 26, diode 26 will conduct allowing the energy stored in transformer 20 to discharge into capacitor 27. This period of energy transfer is called the flyback interval and during this period the voltage on capacitor 27 will begin to rise. Since diode 26 must continue to conduct so that all the energy stored in transformer 20 can be transferred to capacitor 27 and since the voltage on capacitor 27 is increasing, the voltage induced in secondary 24–25 must also increase so as to keep diode 26 conducting. When the energy in transformer 20 has discharged, there will be no voltages in its windings to maintain switching device 28 at cut-off and the converter circuit will again operate to recharge it. During the next flyback interval, the voltage induced in winding 24–25 will be greater in magnitude than the voltage induced therein during the previous flyback interval, because the voltage on capacitor 27 has increased. Thus, capacitor 27 will be charged to the desired voltage in successive steps.

Assume that the magnitude of the desired voltage on capacitor 27 is X volts. Ordinarily, the above described converter circuit will continue to operate after the capacitor 27 has reached its desired voltage level. Since capacitor 27 has been charged to X volts, there is no need to have the converter circuit continue working. In fact, there will be needless waste of power in the circuit if the converter circuit is allowed to continue to operate after this; also there is the danger of destroying capacitor 27 by over-voltaging it. However, by placing sensing means 32 across one of the windings of transformer 20 which conducts when capacitor 27 has reached X volts, it is possible to stretch the flyback interval in time, thereby slowing down and increasing the overall efficiency of the converter circuit.

If the number of turns in output winding 24–25 is designated $N_o$ and the number of turns in input winding 22–23 as $N_i$ and if the voltage induced in output winding 24–25 is Y volts, then the voltage reflected back to input winding 22–23 is $N_i/N_o$ times Y volts. Likewise, if the number of turns in primary winding 21–23 is $N_p$ and the number of turns in control winding 21–22 is $N_c$, then the voltages reflected back to these windings are $N_p/N_o$ times Y volts and $N_c/N_o$ times Y volts respectively.

Assume now that capacitor 27 has been charged to something less than X volts and that a new flyback interval begins. The induced voltage in winding 24–25 will rise to a value that exceeds the forward conducting voltage of diode 26 and the voltage on capacitor 27, causing the voltage on capacitor 27 to begin to rise to X volts. When the voltage on capacitor 27 is X volts, the voltage induced in winding 24–25 of transformer 20 is X volts plus the voltage drop across diode 26 and in this case, this total can be considered as equal to Y volts. Since, in FIGURE 1 sensing means 32 is connected across input winding 22–23 and did not conduct during the time it took to charge capacitor 27 to X volts, it should conduct when the voltage on capacitor 27 reaches X volts. Therefore, the voltage induced in winding 24–25 at this time being considered as equal to Y volts, the voltage reflected back to input winding 22–23 is $N_i/N_o$ times Y volts. Thus, sensing means 32 is designed to have a conducting threshold voltage of $N_i/N_o$ times Y volts.

While sensing means 32 is conducting it must present to input winding 22–23, and hence to all windings, a much lower value of resistance than when it is not conducting. Since the discharge time of an inductor is inversely proportional to the resistance across it, it is evident that when conducting, sensing means 32 increases the discharge time of transformer 20. Since the converter circuit will not become operable to recharge transformer 20 until the energy stored therein has been discharged, it is obvious that the flyback interval of the converter circuit is increased because of the increase of discharge time of transformer 20. When sensing means 32 conducts, the voltages across the windings of transformer 20 drop to low values because of the reduced resistance presented by sensing means 32 and the lower the values the longer the converter circuit will be off.

Figure 2:
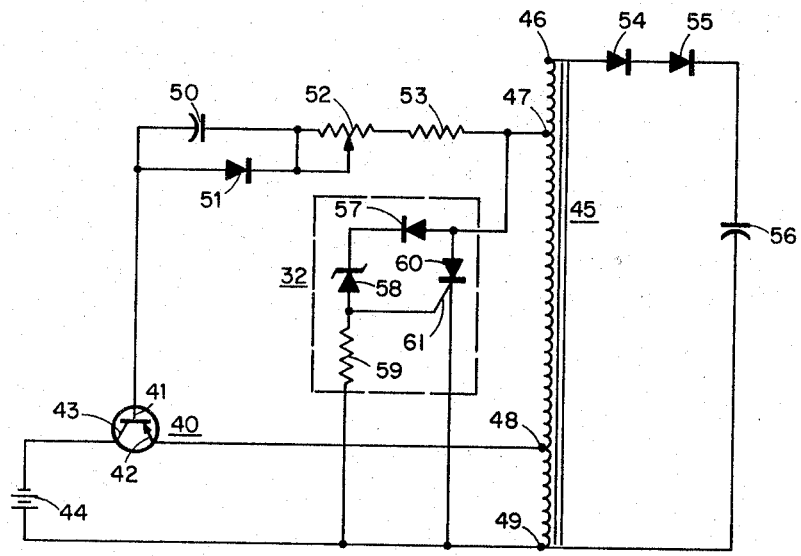
FIGURE 2 illustrates schematically a preferred embodiment of my invention.

With reference to FIGURE 2 there is shown a PNP transistor 40 having a base 41, an emitter 42, and a collector 43. Collector 43 is connected to the negative terminal of battery 44 whose positive terminal is connected to terminal 49 of flyback transformer 45. Terminal 48 of flyback transformer 45 is connected to emitter 42. The turns between terminals 48 and 49 constitute input winding 48–49 of flyback transformer 45. Base 41 is connected to the parallel protective circuit comprising capacitor 50 and diode 51, which circuit is connected, as illustrated, to the series circuit of biasing resistors comprising variable resistor 52 and fixed resistor 53. The other end of the series circuit of variable resistor 52 and fixed resistor 53 is connected to terminal 47 of flyback transformer 45. The turns between terminals 47 and 48 of flyback transformer 45 constitute control winding 47–48. Connected to terminal 46 of flyback transformer 45 is the series circuit of diodes 54 and 55, the other end of this series circuit being connected to one plate of capacitor 56. The other plate of capacitor 56 is connected to terminal 49 of flyback transformer 45. The turns between terminals 46 and 49 represent output winding 46–49 of flyback transformer 45.

If no more components were added to this circuit, one would have a conventional D.C.-to-D.C. converter circuit, and the circuit would continue to operate after capacitor 56 had charged to the desired voltage. As stated before, to have this circuit shut off, one should add sensing means across one of the windings of flyback transformer 45. The sensing means should start to conduct at a threshold voltage dictated by the voltage desired on capacitor 56 plus the voltage drops across diodes 54 and 55 and should have a low resistance when conducting. In the previous circuit, I connected sensing means 32 across input winding 22–23, but now I shall connect sensing means 32 across the full primary; that is, across the turns between terminals 47 and 49 of flyback transformer 45. There is also shown in FIGURE 2 diode 57 connected between terminal 47 of flyback transformer 45 and one terminal of zener diode 58. The other terminal of zener diode 58 is connected through resistor 59 to terminal 49 of flyback transformer 45. Also connected to terminal 47 is one terminal of silicon controlled rectifier 60 whose control electrode 61 is connected to the junction of zener diode 58 and resistor 59. The other terminal of silicon controlled rectifier 60 is connected to terminal 49. The function of resistor 59 is to prevent self-triggering of silicon controlled rectifier 60. The combination of silicon controlled rectifier 60, diode 57, zener diode 58 and resistor 59 is the equivalent of the aforementioned sensing means 32, as illustrated by the dashed line marked with reference numeral 32.

The shut off action of this converter circuit is the same as discussed above with reference to FIGURE 1. Thus, when the base current can no longer sustain an increase in current in the output circuit of transistor 40, transistor 40 will shut off, thereby starting the flyback interval. When this interval starts, the aforementioned capacitor charging action begins; that is, the polarity of the voltages in the windings of flyback transformer 45 reverses, thereby causing diodes 54 and 55 to conduct, charging capacitor 56. As pointed out in the previous discussion sensing means 32 should conduct when capacitor 56 has reached a desired voltage, such as X volts. When the voltage induced in output winding 46–49 is equal to X volts, plus the voltage drops across diodes 54 and 55, or Y volts, the reflected voltage at primary winding 47–49 will be $N_p/N_o$ times Y volts. Therefore, sensing means 32 comprises silicon controlled rectifier 60, diode 57, zener diode 58 and resistor 59 should be operative when the voltage induced in primary winding 47–49 is equal to $N_p/N_o$ times Y volts. Consequently, during the flyback interval when capacitor 56 is charged to X volts, $N_p/N_o$ times Y volts will be applied to zener diode 58 via diode 57. The forward conducting voltage of zener diode 58 is somewhat less than $N_p/N_o$ times Y volts for there is a small voltage drop across diode 57, but the voltage applied to zener diode 58 is sufficient to cause it to conduct, resulting in current flow in resistor 59, sufficient to trigger silicon controlled rectifier 60. When silicon controlled rectifier 60 conducts, it presents to the primary winding 47–49 a much lower resistance than when said rectifier 60 is not conducting. As heretofore explained, this decrease in effective resistance across a winding of a flyback transformer will increase the time it takes to discharge the energy contained therein. Hence, the decrease in resistance presented to winding 47–49 of flyback transformer 45 will increase the time of the flyback interval of the converter circuit shown in FIGURE 2, thereby increasing the efficiency of said circuit and prolonging the life of battery 44. Again, the voltages in flyback transformer 45 will drop to a low level because of the decrease in resistance offered by silicon controlled rectifier 60 which is connected across primary winding 47–49. The combination of silicon controlled rectifier 60, diode 57, zener diode 58 and resistor 59 is a preferred embodiment of my sensing means 32, since it presents a very low resistance to the winding of flyback transformer 45.

Note the different locations of sensing means 32 in FIGURES 1 and 2. In FIGURE 1 sensing means 32 is connected across input winding 22–23, whereas in FIGURE 2 it is connected across primary winding 47–49 of flyback transformer 45. This substantiates my assertion that sensing means 32 can be connected across any of the windings of a flyback transformer used in a D.C.-to-D.C. flyback converter circuit. In both embodiments the energy that renders sensing means 32 conductive is obtained from the flyback transformer and not from the voltage supply, thereby conserving energy in said supply.

Again, with reference to FIGURE 2, note that the parallel circuit of capacitor 50 and diode 51 forms a protective circuit which, during the flyback interval, prevents the high voltage induced in winding 47–48 from being applied to the emitter-base junction of transistor 40, destroying said transistor.

There are, of course, many different converter circuits that can utilize my invention. For example, a mechanical device such as a vibrator can be used as the switching device, as long as a voltage in one of the windings of the flyback transformer is sufficient to hold the vibrator non-operative while sensing means 32 is conducting.

Moreover, the flyback transformer used in the described circuits each have control, input and output windings; but other transformers with fewer or more windings may be incorporated, the number of windings being dictated by the needs of the switching device.

Also, sensing means 32 is not to be limited to semi-conductors or devices with unidirectional characteristics such as silicon controlled rectifiers, four-layer diodes, and transistors. Any device or combination of devices that has a sufficient forward conducting threshold voltage greater than its extinguishing voltage may be used. A good example of a device that can be used as sensing means 32 and that can conduct in two directions is a common neon bulb. A neon bulb has the proper characteristics in both directions; that is, the conducting threshold voltage of the neon bulb is greater in magnitude than the extinguishing voltage of said neon bulb. Other modifications can also be made without departing from the spirit and scope of my invention, as defined in the appended claims.

I claim:

1. In a flyback converter circuit having a flyback transformer with a plurality of windings and adapted to provide a charging voltage to a capacitor through a diode during the flyback interval, the improvement of means for preventing further charging of said capacitor by reducing said charging voltage and for lengthening said flyback interval by increasing the $L/R$ time constant of one of said plurality of windings after said capacitor becomes charged to a predetermined voltage without substantial discharge of said capacitor, said means being connected directly to the terminals of said one of said plurality of windings and adapted to shunt said winding with a low resistance when said charging voltage exceeds said predetermined voltage.

2. The improvement as in claim 1 in which said means comprises:
    a silicon controlled rectifier connected directly to the terminals of said one of said plurality of windings; and
    circuit means also connected directly to the terminals of said one of said plurality of windings and to the input gate of said silicon controlled rectifier and adapted to trigger said silicon controlled rectifier into conduction when said charging voltage exceeds said predetermined voltage.

3. The improvement as in claim 1 in which said means comprises a gas discharge tube.

4. In a flyback converter circuit having a flyback transformer with an input winding, a control winding and an output winding and adapted to provide a charging voltage from said output winding through a diode to a capacitor during the flyback interval, the improvement of means for preventing further charging of said capacitor by reducing said charging voltage and for lengthening said flyback interval by increasing the $L/R$ time constant of said input winding after said capacitor becomes charged to a predetermined voltage without substantial discharge of said capacitor, said means being connected directly to the terminals of said input winding, and adapted to become operative when the voltage reflected in said input winding from said output winding exceeds the product of said predetermined voltage and the ratio of the turns in the input winding to the turns in the output winding thereupon shunting said input winding with a low resistance.

5. The improvement as in claim 4 in which said means comprises:
    a silicon controlled rectifier connected directly to the terminals of said input winding; and
    circuit means also connected directly to the terminals of said input winding and to the input gate of said silicon controlled rectifier and adapted to sense the voltage reflected into said input windings to trigger said silicon controlled rectifier into conduction.

6. The improvement as in claim 5 in which said circuit means comprises a Zener diode having a Zener threshold voltage substantialy equal to the voltage reflected into said input winding when said charging voltage commences to exceed said predetermined voltage.

7. The improvement as in claim 6 in which said circuit means further comprises:
    a resistor having one terminal connected to one terminal of said input winding and its other terminal connected to the anode of said Zener diode and to the input gate of said silicon controlled rectifier; and
    a diode having its anode connected to the other terminal of said input winding and its cathode connected to the cathode of said Zener diode, said diode functioning to prevent forward current flow through said Zener diode while said flyback transformer is being charged and said resistor functioning to provide a trigger voltage to said input gate when said Zener diode is conducting.

8. In a flyback converter circuit having a flyback transformer with an input winding, a control winding and an output winding and adapted to provide a charging voltage from said output winding through a diode to a capacitor during the flyback interval, the improvement of means for preventing further charging of said capacitor by reducing said charging voltage and for lengthening said flyback interval by increasing the $L/R$ time constant of said output winding after said capacitor becomes charged to a predetermined voltage without substantial discharge of said capacitor, said means being connected directly to the terminals of said output winding, and adapted to become operative when the voltage induced in said output winding exceeds said predetermined voltage thereupon shunting said output winding with a low resistance.

9. The improvement as in claim 8 in which said means comprises:
  a silicon controlled rectifier connected directly to the terminals of said output winding; and
  circuit means also connected directly to the terminals of said output winding and to the input gate of said silicon controlled rectifier and adapted to sense the voltage induced in said output winding to trigger said silicon controlled rectifier into conduction.

10. In a flyback converter circuit having a flyback transformer with an input winding, a control winding and an output winding and adapted to provide a charging voltage from said output winding through a diode to a capacitor during the flyback interval, the improvement of means for preventing further charging of said capacitor by reducing said charging voltage and for lengthening said flyback interval by increasing the $L/R$ time constant of said control winding after said capacitor becomes charged to a predetermined voltage without substantial discharge of said capacitor, said means being connected directly to the terminals of said control winding and adapted to become operative when the voltage reflected in said control winding from said output winding exceeds the product of said predetermined voltage and the ratio of the turns in the control winding to the turns in the output winding thereupon shunting said control winding with a low resistance.

11. The improvement as in claim 10 in which said means comprises:
  a silicon controlled rectifier connected directly to the terminals of said control winding; and
  circuit means also connected directly to the terminals of said control winding and to the input gate of said silicon controlled rectifier and adapted to sense the voltage reflected into said control winding to trigger said silicon controlled rectifier into conduction.

12. The improvement as in claim 11 in which said circuit means comprises a Zener diode having a Zener threshold voltage substantialy equal to the voltage reflected into said control winding when said charging voltage commences to exceed said predetermined voltage.

13. The improvement as in claim 9 in which said circuit means comprises a Zener diode having a Zener threshold voltage just exceeding said predetermined voltage.

References Cited by the Examiner

UNITED STATES PATENTS 2,854,615  9/1958  Light _____ 321—2
2,976,461  3/1961  Dilger et al. _____ 315—209

OTHER REFERENCES

Pages 17–18, August 1959—"A Survey of Some Circuit Applications of the Silicon Controlled Switch and—Silicon Controlled Rectifier," Solid State Products Bulletin.

BERNARD KONICK, *Primary Examiner.*

J. BREIMAYER, *Assistant Examiner.*